US006126222A

United States Patent [19]

Nguyen et al.

[11] Patent Number: 6,126,222

[45] Date of Patent: Oct. 3, 2000

[54] LIFTGATE ASSEMBLY

[75] Inventors: Quang Vinh Nguyen, Canton; Richard H. Wykoff, Walled Lake; Richard Kollar, Riverview, all of Mich.; Brad Watson, Sharon, Canada

[73] Assignee: Ford Global Technologies, Inc., Dearborn, Mich.

[21] Appl. No.: 09/073,527

[22] Filed: May 6, 1998

[51] Int. Cl.[7] .......... B62D 25/00

[52] U.S. Cl. .......... 296/56; 296/106; 296/76; 296/146.8; 16/82

[58] Field of Search .......... 296/56, 106, 76, 296/146.8; 16/82

[56] References Cited

U.S. PATENT DOCUMENTS

| | | | |
|---|---|---|---|
| 2,175,534 | 10/1939 | Loftin et al. . | |
| 2,538,930 | 1/1951 | Zummach | 296/106 |
| 2,908,415 | 10/1959 | Bogater et al. . | |
| 2,919,946 | 1/1960 | Miener | 296/76 |
| 3,181,911 | 5/1965 | Peras | 296/76 |
| 3,195,172 | 7/1965 | Gionet | 296/76 |
| 3,910,625 | 10/1975 | Menard | 296/76 |
| 4,062,583 | 12/1977 | Taylor | 296/76 |
| 4,188,061 | 2/1980 | Shehi | 296/76 |
| 4,202,578 | 5/1980 | Roullier et al. | 296/106 |
| 4,634,170 | 1/1987 | Lach | 296/76 |
| 4,823,059 | 4/1989 | Compeau et al. | 296/76 |
| 4,828,236 | 5/1989 | Inoue . | |
| 4,925,230 | 5/1990 | Shelton | 296/106 |
| 5,331,718 | 7/1994 | Gilbert et al. . | |
| 5,361,612 | 11/1994 | Voiculescu et al. | 296/76 |
| 5,531,498 | 7/1996 | Kowall . | |
| 5,630,249 | 5/1997 | Rebai, Jr. . | |
| 5,667,268 | 9/1997 | Bump | 296/56 |

FOREIGN PATENT DOCUMENTS

| | | |
|---|---|---|
| 236519 | of 0000 | European Pat. Off. . |
| 3102891 | of 0000 | Germany . |
| 103730 | of 0000 | Japan . |
| 1577 | of 0000 | Japan . |
| 406144013 | 5/1994 | Japan . |

*Primary Examiner*—Joseph D. Pape
*Assistant Examiner*—Kiran Patel

[57] ABSTRACT

An automotive liftgate assembly for limiting movement of a liftgate along a predetermined direction by utilization of a liftgate limiter. This liftgate limiter is secured to the entryway and has a retractable cable which is coupled to the pivoting liftgate. The extractable cable length is adjustable so as to vary the liftgate's open position.

4 Claims, 5 Drawing Sheets

LIFTGATE ASSEMBLY

FIELD OF THE INVENTION

This invention relates to an automotive liftgate assembly. More particularly, this invention relates to a pivoting liftgate whose movement is along a predetermined vertical direction and where the full open position is limited so that the liftgate needs of the vehicle user are met.

BACKAROUND OF THE INVENTION

In today's automotive markets, sport utility vehicles and mini vans are becoming ever more prevalent. The rear portion of these vehicles typically have pivoting liftgates. These liftgates pivot in a vertical direction from a low elevation, closed position, to a high elevation, or fully open position. The height of the full open position is a matter of concern should the liftgate be opened in a confined space, such as a low overhead garage or a driveway with low overhead tree branches. In addition, users of a sport utility vehicle come in all shapes and sizes. This means the desirable maximum height of a fully open liftgate is different for a short individual as opposed to a tall individual. A person of short stature must be able to reach the handle of a liftgate in order to close it. Yet, a person of high stature should not have to bend beneath the liftgate in order to gain access to the contents of the vehicle. Consequently, a means to simply adjust the open height of the liftgate is desirable.

Typically, the full open height of a liftgate assembly is dictated by a plurality of pneumatic cylinder devices. In fact, not only have these pneumatic cylinders, when fully extended, served as a liftgate stop but they also provide a biasing force which assists the user in opening the liftgate. Prior art has utilized these pneumatic cylinders to define the full-open position or the maximum height of the liftgate by providing a mechanical limiting means on the cylinder devices themselves.

SUMMARY OF THE INVENTION

This invention relates to an automotive liftgate assembly having an entryway, a liftgate pivotally hinged to the automotive vehicle entryway, and a liftgate limiter which includes two distinct embodiments: one, a non-adjustable liftgate limiter and two, an internally adjustable liftgate limiter.

The first embodiment includes a housing which is mounted to the automotive vehicle entryway adjacent to the liftgate. This housing has a top half and a bottom half. The bottom half contains an exterior surface which is in contact with the vehicle entryway, and an interior surface where a primary axle is extended rigidly and normally therefrom. A spool is rotatably mounted within the housing about the primary axle.

A cable is wound about the spool when the cable is stored within the housing. The cable itself has an extractable end and a spool end which is firmly secured to the spool itself. A recoil spring is interposed between the spool and the housing. The recoil spring is secured to the spool and wrapped about the primary axle. The purpose of the recoil spring is to bias the cable to a retracted position. The cable guide, which may consist of a pulley or a friction-free surface, is secured to the housing. The cable extends from the housing and is coupled to the liftgate. Opening of the liftgate will affect extension of the cable from the housing with the extractable cable length determining the full open position of the liftgate, and with the closing of the liftgate resulting in a resilient retraction of the cable back into the housing.

The second embodiment, adjustable liftgate limiter, further includes a housing top half which contains an opening centered about the primary axle. Also, a circular member is rotatable and coaxially mounted within the housing about the primary axle. The circular member encapsulates the spool and has a bottom annular surface which faces the bottom half interior surface. A top annular surface of the circular member engages an interior surface of the top half. A peripheral edge of the circular member is thereby defined by the distance between the parallel planes of the top and bottom annular surfaces. The circular member includes a knob which concentrically protrudes from the plane of the top annular surface and through the top half opening.

The second embodiment further includes a plurality of leaf springs, secured to the bottom half interior surface. These leaf springs produce a resilient force upon the bottom annular surface so that the top annular surface rigidly engages the top half interior surface until such a downward force is exerted upon the knob and against the leaf spring so as to disengage the circular member from the housing.

A plurality of member pulleys are rotatably secured to the circular member's peripheral edge. These pulleys receive and guide the cable from the spool, within the same plane, to the cable guide itself. A plurality of mating notches are embellished upon the circular member's top annular surface and the top half's interior surface, wherein the resilient force of the leaf springs cause engagement of the notches, preventing rotation of the circular member. A plurality of circular member positions are defined by the notches. These notches are confined between a rotational distance which is restricted by a rotational channel along the circular member's bottom annular surface where the rotational channel is in receipt of a stationary peg secured to the bottom half of the interior surface of the housing.

The current invention provides an advantage over prior art in that the liftgate limiter, and not the pneumatic cylinders, is the restraining means which defines the open position of the liftgate. In addition, the extractable cable length of the liftgate limiter can be adjustable, whereby the shorter the extraction length of the cable, the lower the full-open position of the rear hatch door. This lower position will assist an individual of lower stature in reaching the opened liftgate for purposes of pulling it closed, and/or, this lower position will prevent the liftgate from making unintentional contact with overhead trees, garage doors or other obstacles.

BRIEF DESCRIPTION OF THE DRAWINGS

These and other objects, advantages, and features of the present invention will be apparent to those skilled in the vehicle arts upon reading the following description with reference to the accompanying drawings, in which.

DETAILED DESCRIPTION OF THE PREFERRED EMBODIMENTS

Figure 1:
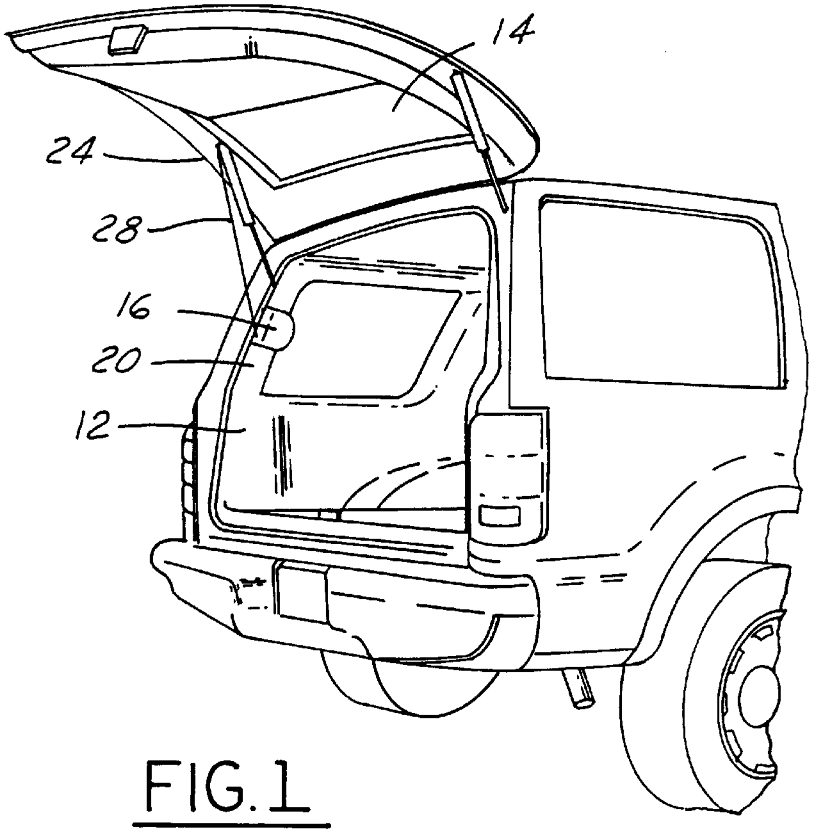
FIG. 1 shows a liftgate assembly in it's full open position.

Referring now to FIG. 1 of the drawings, an automotive liftgate assembly is utilized for alternately covering entryway 12 when in a closed position (not shown), and uncovering entryway 12 when in an open position. The liftgate assembly of the present invention has a liftgate 14 which is pivotally connected to entryway 12, and a liftgate limiter 16 which is mounted to an interior portion 20 of entryway 12. Liftgate limiter 16 limits the full open position of pivoting liftgate 14 along a predetermined direction. Liftgate limiter 16 has two distinct embodiments, the first being non-adjustable and the second being adjustable.

Figure 2:
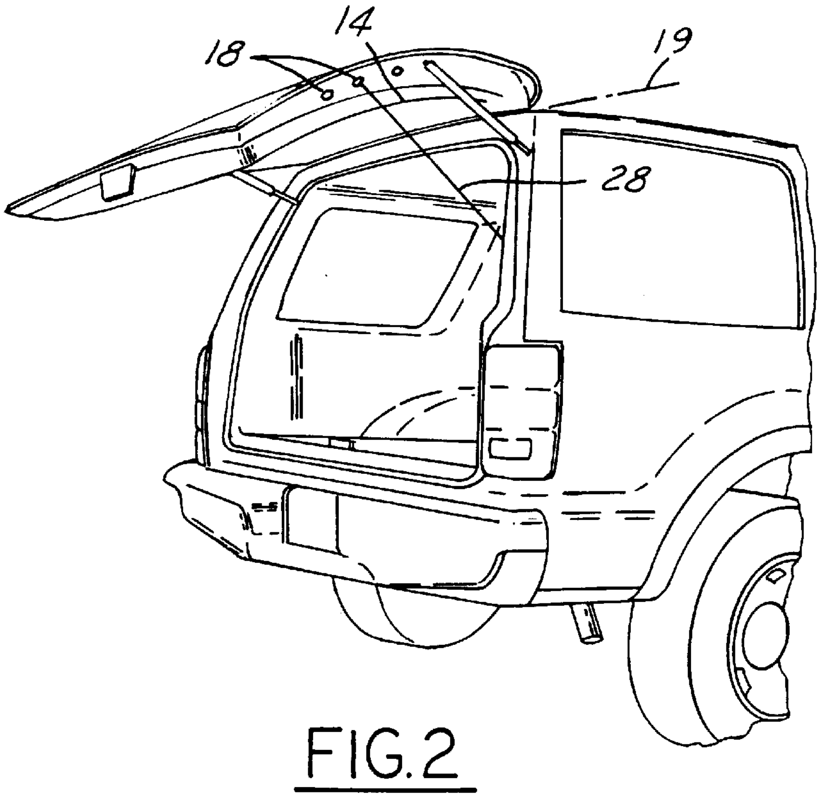
FIG. 2 shows a liftgate assembly also in an intermediate open position.
Figure 3:
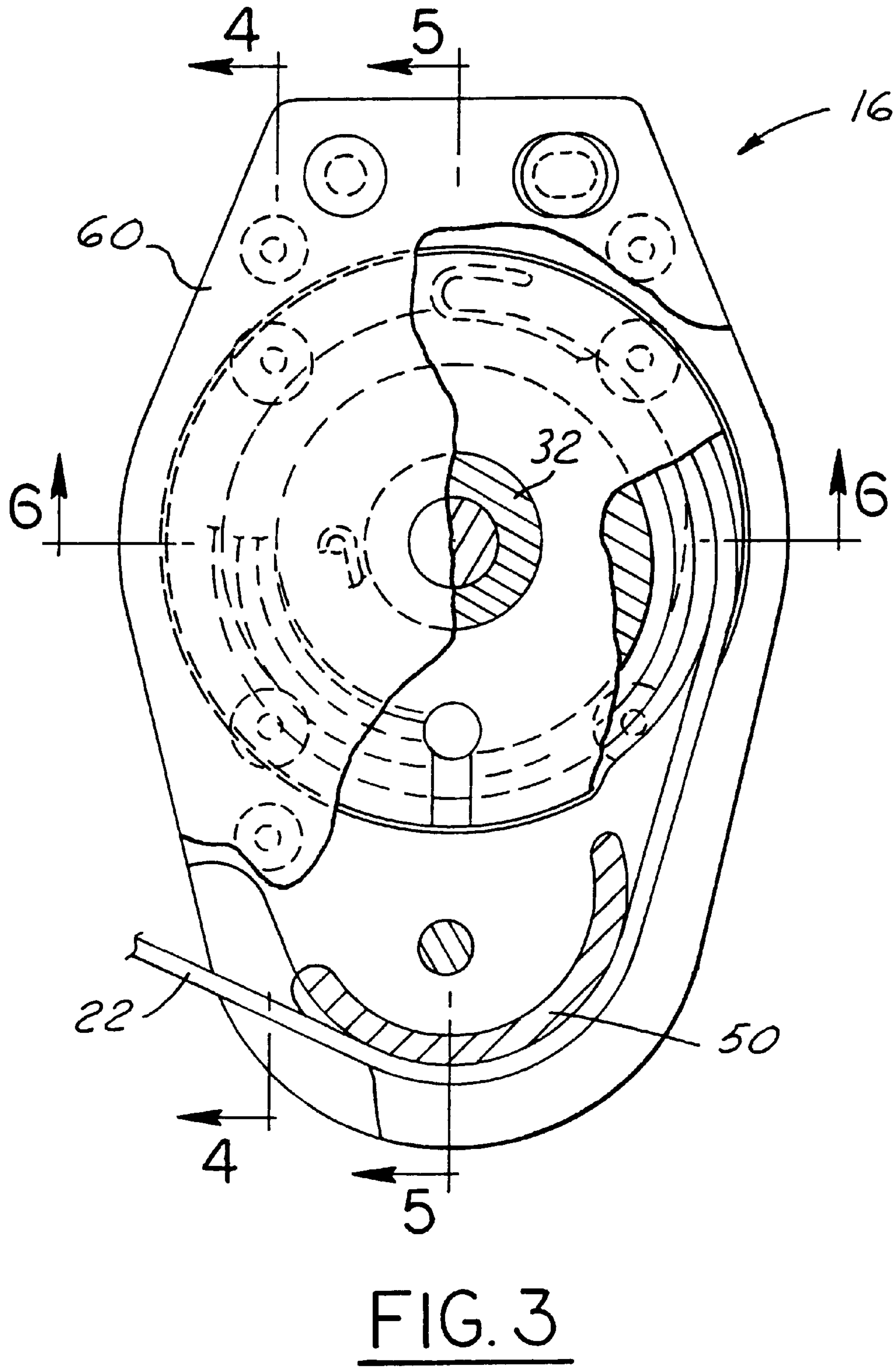
FIG. 3 shows a frontal, cut-away, view of a nonadjustable liftgate limiter.
Figure 4:
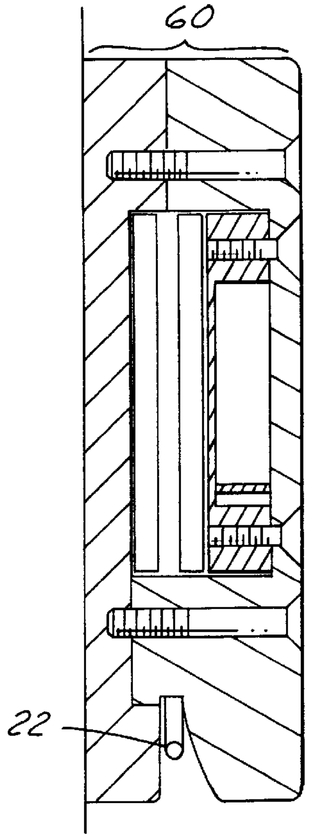
FIG. 4 shows a side, cross-sectional, view of a nonadjustable liftgate limiter taken along line 4—4 of FIG. 3.

FIG. 2 shows liftgate 14 in an intermediate open position which can be achieved by either a plurality of coupling receptacles 18 positioned at an increasing distance away from a pivotal axis 19, or, by an internal adjustment of the second embodiment of liftgate limiter 16 (FIGS. 8-11).

Figure 5:
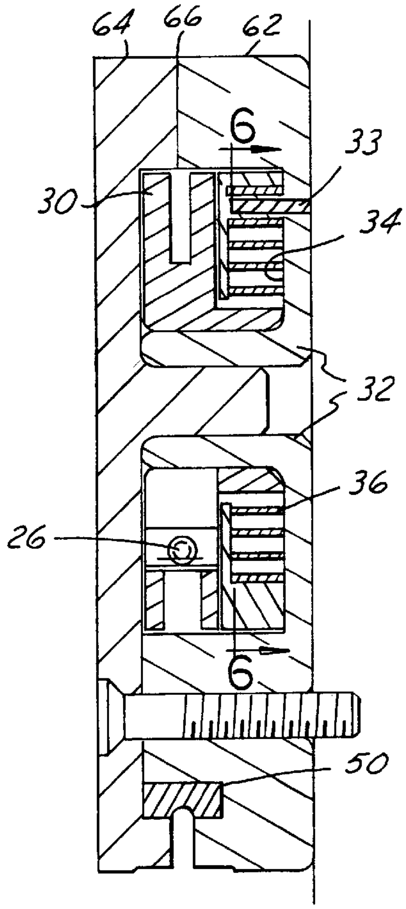
FIG. 5 shows a side, cross-sectional, bisecting, view of a non-adjustable liftgate limiter taken along line 5—5 of FIG. 3.
Figure 9:
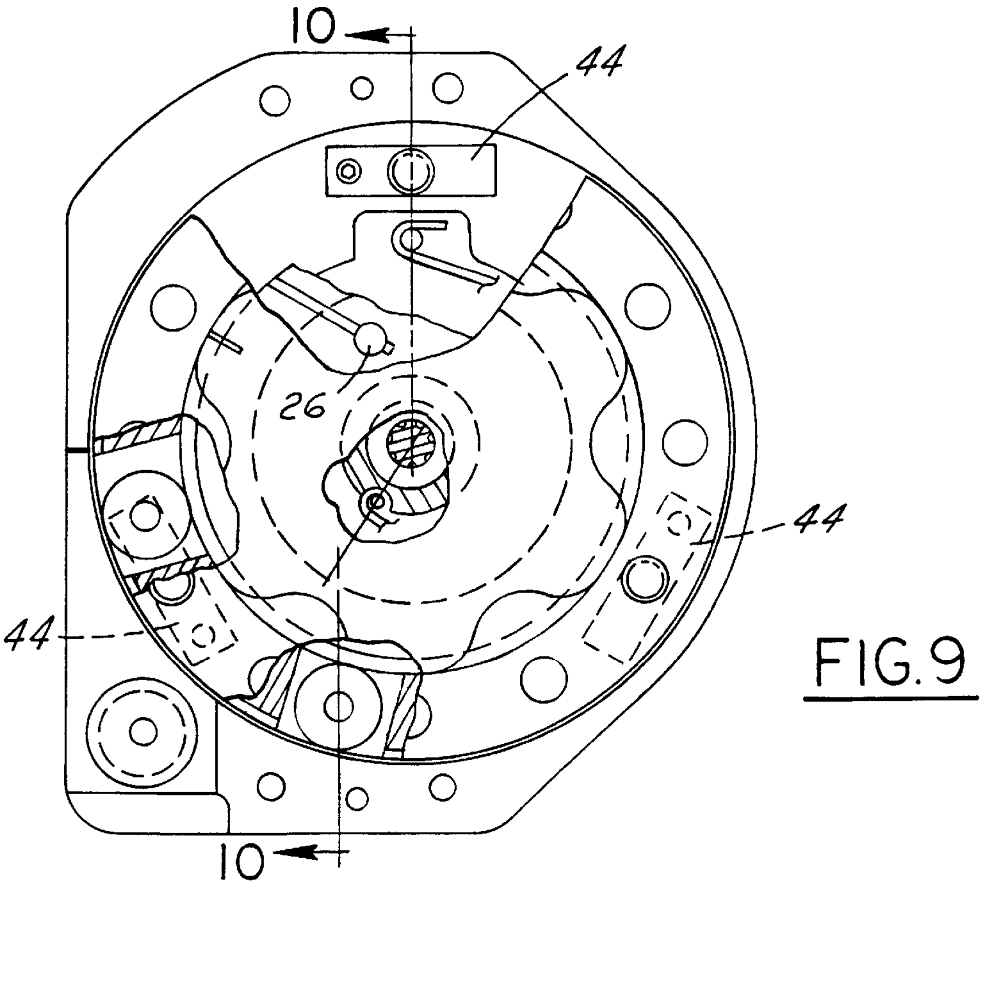
FIG. 9 shows a frontal, cut-away, view of an adjustable liftgate limiter.
Figure 10:
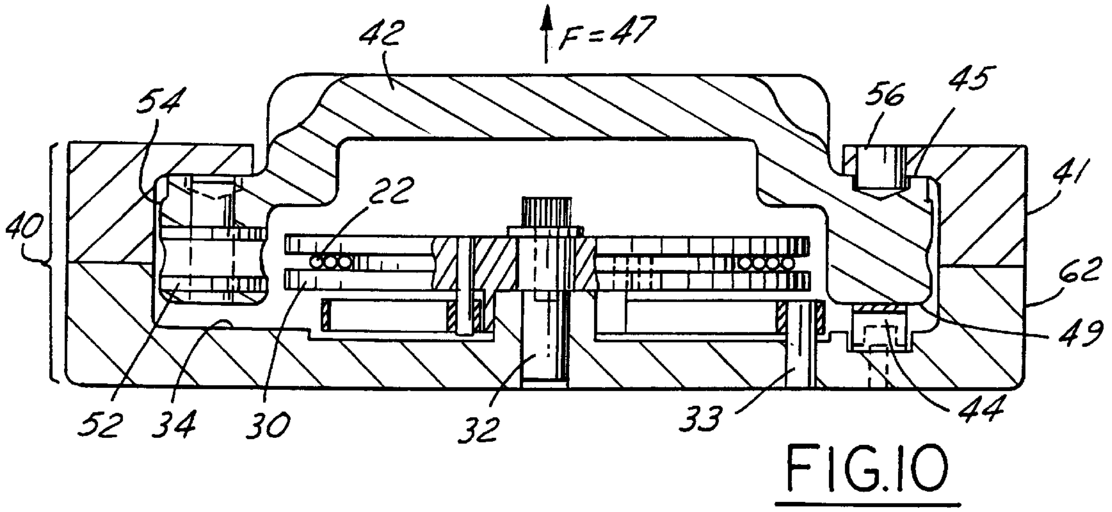
FIG. 10 shows a side, cross-sectional, view of an adjustable liftgate limiter taken along 10—10 of FIG. 9; where the notches or pins are engaged.
Figure 11:
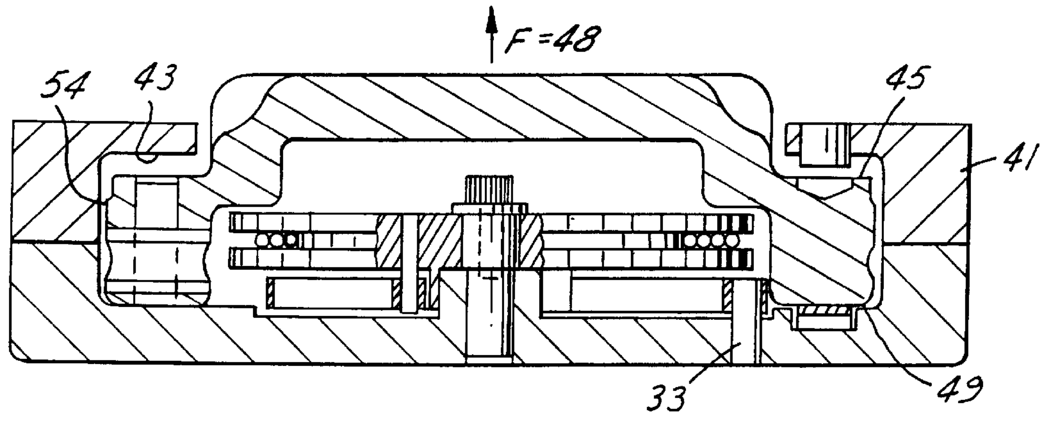
FIG. 11 is similar to FIG. 10 except that the notches are disengaged.

Referring to FIGS. 3 through 7, the first embodiment of liftgate limiter 16 has a housing 60 mountable to an interior portion 20 of an automobile adjacent to liftgate 14 and cable 22 stored within housing 60 which can be extractably extended therefrom. Cable 22 has a cable extractable end 24 (FIG. 1), a cable spool end 26 (FIG. 5 or 9), and an extractable cable length 28 (FIG. 1) which can be extracted from housing 60 (FIGS. 3 or 4) and is coupled to liftgate 14 where opening of liftgate 14 will effect extension of cable 22 from housing 60. Extractable cable length 28 determines the intermediate open position of liftgate 14. The closing of liftgate 14 results in a resilient retraction of extractable cable length 28 back into housing 60. It should be further understood that the term cable 22, for both liftgate limiter 16 embodiments is not limited to the commonly understood steel cable, but may include any other structural linkage of sufficient tensile strength to perform the specified functions. Additional structures include, but are not limited to, chains, ropes, straps and lines, capable of winding about spool 30 (FIGS. 5 or 10).

Furthermore, as seen in FIG. 5, non-adjustable liftgate limiter housing 60 has bottom half 62 and top half 64 each having a mating surface 66 whose plane is normal to primary axle 32 which rigidly extends from an interior surface 34 of bottom half 62 of housing 60. A spool 30 is rotatably mounted within housing 60 about primary axle 32 with cable 22 being spirally wound about spool 30 when stored within housing 60 (FIG. 6).

Figure 6:
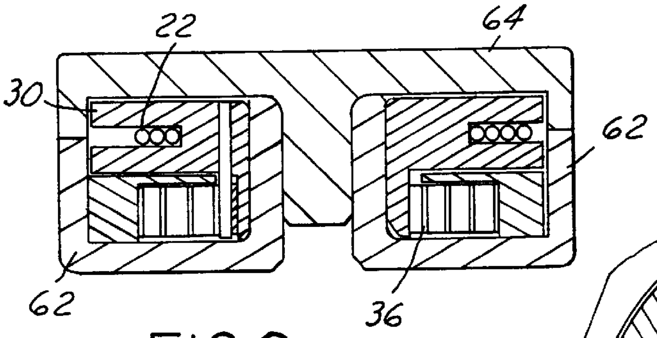
FIG. 6 shows a side, cross-sectional, bisecting, view of a non-adjustable liftgate limiter tsken slong line 6—6 of FIG. 5, rotated 90 degrees from that of FIG. 5.
Figure 7:
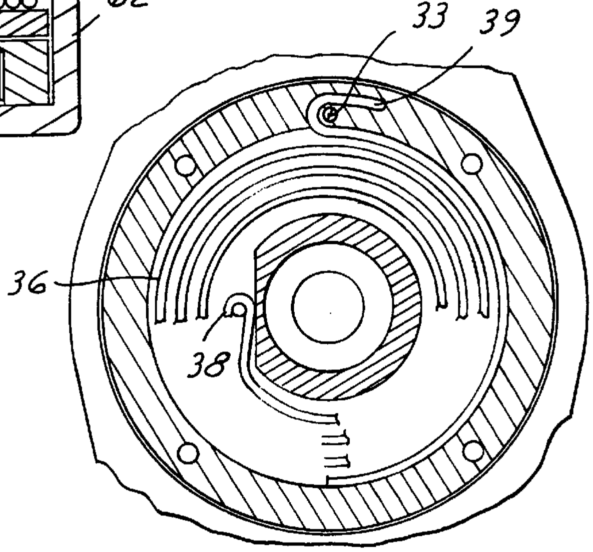
FIG. 7 shows a partial, cross-sectional, frontal view of a non-adjustable liftgate limiter, detailing the recoil spring assembly.

Referring to FIGS. 5 & 6 of the first embodiment, recoil spring 36 is interposed between spool 30 and housing bottom half 62 by way of a recoil spring inner radial end 38, and recoil spring outer radial end 39. Recoil spring 36 wraps about primary axle 32 and is further secured, by way of a pin 33 to a bottom annular surface 34 of spool 30 (FIGS. 5 & 7), whereby recoil spring 36 biases cable 22 to a retracted, coiled, position.

Figure 8:
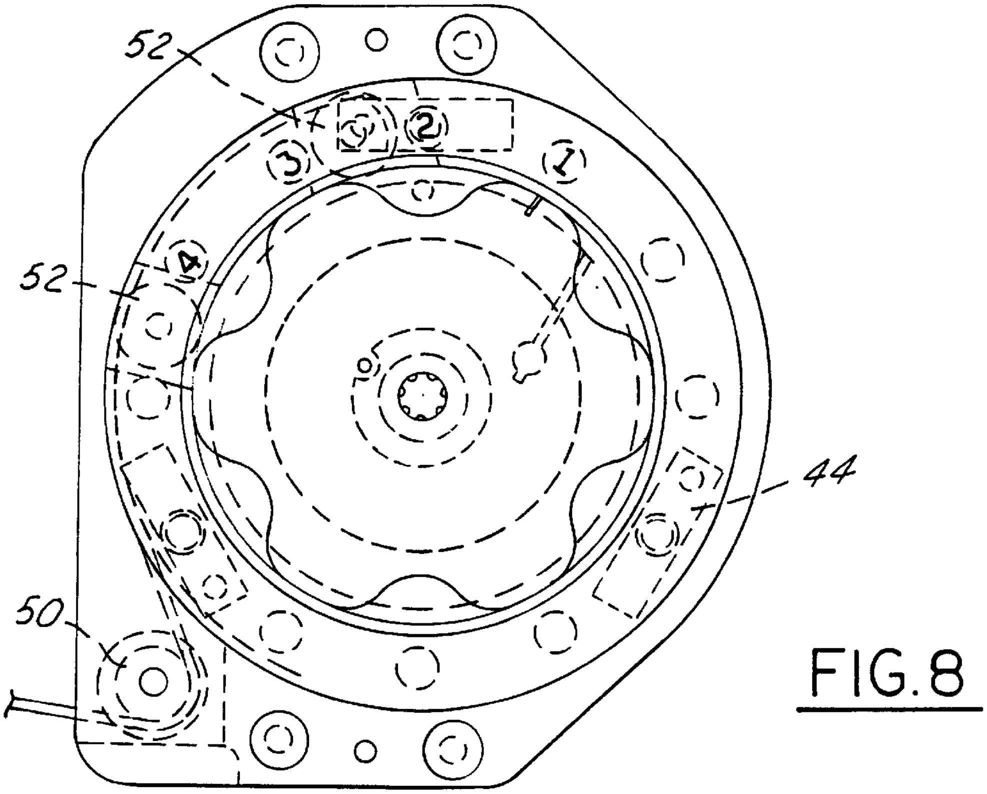
FIG. 8 show a frontal view of an adjustable liftgate limiter.

Also located within housing 60 of the first embodiment, or housing 40 of the second embodiment, and which is in a planar arrangement with spool 30, is a cable guide 50. Cable guide 50 is either stationary (FIGS. 3 & 5) or it is in the form of a pulley (FIG. 8). Cable guide 50 redirects cable 22, tangentially from spool 30, tangentially off guide 50, and straight toward a selected one of plurality of coupling receptacles 18 (FIG. 2). FIG. 10 shows the second embodiment of liftgate limiter 16, which is like the first embodiment of liftgate limiter 16, see FIG. 5, but includes a circular member 42 rotatably and coaxially mounted within a housing 40 about primary axle 32. Circular member 42 encapsulates spool 30 and protrudes through a housing top half 41. As shown in FIGS. 8 & 9, a plurality of leaf springs 44 are secured to an interior surface 34 of housing bottom half 62 so as to produce resilient force 47 upon circular member 42's bottom annular surface 49 (FIG. 10).

In furtherance of the second embodiment's adjustable liftgate limiter 16, a plurality of selector pulleys 54 are rotatably secured to a peripheral edge 52 of circular member 42. These pulleys receive and guide cable 22 from spool 30 within the same plane to cable guide 50. 15 Referring to FIG. 10, a plurality of mating notches 56 are embellished upon a top annular surface 45 of circular member 42 and an interior annular surface 43 (FIG. 11) of top half 41 of housing 40 wherein resilient force 47 produced by plurality of leaf springs 44 causes 20 engagement of notches 56 preventing rotation of the circular member 42. A plurality of circular member positions is defined by these notches. The total range of these circular member 42 positions is dictated by a rotational channel (not shown) engraved on bottom annular 25 surface 49. The rotational channel is in receipt of a stationary peg (also not shown) secured to interior surface 34 of bottom half 62 of housing 40.

Although the preferred embodiments of the present invention have been disclosed, various changes and 30 modifications may be made thereto by one skilled in the art without departing from the scope and spirit of the invention as set forth in the appended claims.

What is claimed is:

1. An automotive liftgate assembly, for limiting movement of a pivoting liftgate along a predetermined direction to alternately cover and uncover an automotive vehicle entryway, comprising:

- a liftgate pivotally hinged to the automotive to vehicle entryway about a pivotal axis; and
- a liftgate limiter which comprises:
- a housing mounted to the automotive vehicle entryway adjacent to the liftgate;
- a primary axle rigidly extending from an interior surface of the housing;
- a spool rotatably mounted within the housing about the primary axle;
- a cable wound about the spool when stored within the housing, the cable having: an extractable predetermined cable length; an extractable cable end; and
- a spool end firmly secured to the spool and;
- a cable guide secured to the housing, the cable extending from the housing and being couplable to the liftgate, whereby opening of the liftgate effects extension of the cable from the housing, with the extractable cable length determining a full open position of the liftgate when uncovering the entryway, with closing of the liftgate resulting in a resilient retraction of the cable into the housing.

2. An automotive rear liftgate assembly as set forth in claim 1, wherein the liftgate limiter is internally adjustable and further comprises:

a housing bottom half having:

an exterior surface in contact with the automotive vehicle rear portion; and a bottom half interior surface whereby the primary axle rigidly extends therefrom;

a housing top half having;

a opening centered above the primary axle; and a top half interior surface;

a circular member rotatably and coaxially mounted within the housing about the primary axle, encapsulating the spool, the circular member having:

a bottom annular surface which faces the bottom half interior surface;

a top annular surface which engages the top half interior surface;

a peripheral edge whose thickness is formed by the distance between the parallel planes of the top and bottom annular surfaces; and a knob which concentrically protrudes from the plane of the top annular surface through the top half opening;

a plurality of leaf springs secured to the bottom half interior surface, axially imposing upon the bottom annular surface so that the top annular surface rigidly engages the top half interior surface until such downward force is exerted upon the knob and against the leaf springs so as to disengage the circular member from the housing;

a plurality of member pulleys rotatably secured to the circular member peripheral edge, receiving and guiding the cable from the spool, within same plane, to the cable guide;

a plurality of mating notches embellished upon the circular member top annular surface and the top half interior surface wherein the resilient force of the leaf springs causes engagement of the notches preventing rotation of the circular member; and a plurality of circular member positions defined by the notches and confined between an angular distance defined by an annular slot along the circular member bottom annular surface where the annular slot is in receipt of a stationary peg secured to the bottom half interior surface of the housing.

3. An automotive rear liftgate assembly as set forth in claim 1, wherein the cable guide is a pulley.

4. An automotive liftgate assembly, for limiting movement of a pivoting liftgate along a predetermined direction to alternately cover and uncover an automotive vehicle entryway, comprising:

a liftgate pivotally hinged to the automotive vehicle entryway about a pivotal axis; and an adjustable liftgate limiter having:

a housing mounted to the automotive vehicle entryway adjacent to the liftgate, the housing having a housing bottom half where the bottom half contains an exterior surface in contact with the automotive vehicle entryway, and a bottom half interior surface having a primary axle rigidly extending normally, therefrom, and the housing also having a housing top half, where the top half contains an opening centered above the primary axle and a top half interior surface;

a spool rotatably mounted within the housing about the primary axle;

a cable wound about the spool when stored within the housing, the cable having an extractable end and a spool end firmly secured to the spool;

a recoil spring interposed between the spool and the housing, the recoil spring wrapping about the primary axle and further secured to the spool, to bias the cable to a retracted position;

a cable guide pulley secured to the housing, the cable extending from the housing and being couplable to the liftgate, so that opening of the liftgate will effect extension of the cable from the housing, with the extractable cable length determining full open position of the liftgate, with closing of the liftgate resulting in a resilient retraction of the cable into the housing;

a circular member rotatably and coaxially mounted within the housing about the primary axle, encapsulating the spool, the circular member having a bottom annular surface which faces the bottom half interior surface, a top annular surface which engages the top half interior surface, a peripheral edge formed by the distance between the parallel planes of the top and bottom annular surfaces, and a knob which concentrically protrudes from the plane of the top annular surface through the top half opening;

a plurality of leaf springs secured to the bottom half interior surface, producing a resilient force upon the bottom annular surface so that the top annular surface rigidly engages the top half interior surface until a downward force which overcomes the resilient force is exerted upon the knob and against the leaf springs so as to disengage the circular member from the housing;

a plurality of circular member pulleys rotatably secured to the circular member peripheral edge, receiving and guiding the cable from the spool, within same plane, to the cable guide;

a plurality of mating notches embellished upon the circular member top annular surface and the top half interior surface wherein the resilient force of the leaf springs causes engagement of the notches preventing rotation of the circular member; and a plurality of circular member positions defined by the notches and confined between an angular distance restricted by an annular slot along the circular member bottom annular surface where the annular slot is in receipt of a stationary peg secured to the bottom half interior surface of the housing.

* * * * *